(12) United States Patent (10) Patent No.: US 7,992,450 B2
Springer et al. (45) Date of Patent: Aug. 9, 2011

(54) DEVICE AND METHOD FOR MEASURING AMOUNTS OF MILK IN PARTICULAR DURING THE MILKING PROCESS

(75) Inventors: Andreas Springer, Beckum (DE); Otto Krone, Ibbenbüren (DE)

(73) Assignee: Gea Farm Technologies GmbH, Bonen (DE)

( * ) Notice: Subject to any disclaimer, the term of this patent is extended or adjusted under 35 U.S.C. 154(b) by 511 days.

(21) Appl. No.: 11/663,414

(22) PCT Filed: Oct. 2, 2005

(86) PCT No.: PCT/EP2005/010642
§ 371 (c)(1),
(2), (4) Date: Jul. 7, 2008

(87) PCT Pub. No.: WO2006/037590
PCT Pub. Date: Apr. 13, 2006

(65) Prior Publication Data
US 2009/0025484 A1 Jan. 29, 2009

(30) Foreign Application Priority Data
Oct. 5, 2004 (DE) .................. 10 2004 048 736

(51) Int. Cl.
*G01F 1/56* (2006.01)
(52) U.S. Cl. .................................... 73/861.08
(58) Field of Classification Search ............. 73/861.06, 73/861.08, 861.01, 861.53; 119/14.02, 14.8, 119/14.5, 520, 840
See application file for complete search history.

(56) References Cited

U.S. PATENT DOCUMENTS

| 3,757,773 | A | | 9/1973 | Kolin |
| 4,019,385 | A | | 4/1977 | Watanabe |
| 4,372,249 | A | | 2/1983 | Kiestra et al. |
| 4,480,484 | A | * | 11/1984 | Ueyama ..................... 73/861.08 |
| 5,038,621 | A | * | 8/1991 | Stupecky .................. 73/861.53 |
| 5,094,112 | A | | 3/1992 | Hoefelmayr et al. |
| 5,245,946 | A | | 9/1993 | Hoefelmayr et al. |
| 5,247,836 | A | * | 9/1993 | Lew et al. .................. 73/861.08 |
| 5,503,026 | A | | 4/1996 | Böhm et al. |
| 5,568,788 | A | * | 10/1996 | van den Berg et al. .... 119/14.02 |
| 5,704,311 | A | * | 1/1998 | van den Berg ............ 119/14.02 |
| 6,823,817 | B2 | * | 11/2004 | van den Berg et al. .... 119/14.02 |
| 7,409,871 | B2 | * | 8/2008 | Wang et al. ............... 73/861.01 |

FOREIGN PATENT DOCUMENTS

| DE | 30 20 161 A1 | 12/1981 |
| DE | 37 37 607 A1 | 5/1989 |
| EP | 0 498 080 A2 | 8/1992 |
| EP | 0 536 080 A2 | 4/1993 |
| GB | 2 342 167 | 4/2000 |
| WO | WO 99/45344 | 9/1999 |

* cited by examiner

*Primary Examiner* — Jewel Thompson
(74) *Attorney, Agent, or Firm* — Smith Law Office

(57) ABSTRACT

The invention relates to a device for measuring the mass flow, in particular of a foaming liquid, comprising a measuring device with two electrodes and at least one electrical means for generation of an electrical parameter and an analytical device. The electrical means is connected to the first electrode at two remote points, such as to be wired in parallel with the first electrode. The second electrode is connected to the first electrode by means of the analytical device.

31 Claims, 4 Drawing Sheets

DEVICE AND METHOD FOR MEASURING AMOUNTS OF MILK IN PARTICULAR DURING THE MILKING PROCESS

FIELD AND BACKGROUND OF THE INVENTION

The invention relates to a device and a method for measuring the amounts of milk in particular during the milking process. The invention is generally suitable for determining the quantity of milk yield from cows, ewes, goats, buffaloes, llamas, camels, dromedaries, or of other lactating mammals and will be described below with reference to the milking of e.g. cows.

In addition the invention may be used in other areas of application where the measuring of quantities or mass flows of foamy or foam-forming liquids is concerned such as measuring the mass flow of beers, soft drinks, fruit juices, or other similar food products, as well as foaming or foamy technical fluids, such as electroplating solutions.

Information about the current milk flow is important for controlling the milking process so as to adjust parameters during milking e.g. for specifying the transition from the stimulating phase to the main milking phase, or the removal time. Although a high accuracy level is usually not required, it is desirable.

Milk yield measuring is significant for drawing conclusions on the performance of the individual cows. It is useful to have accuracies meet the requirements of ICAR since this would eliminate the need of regular separate milk yield measuring. Although the requirements for an ICAR (International Committee for Animal Recording) approval depend on the animal variety and other parameters, they are generally high. The allowable error for cows and for milk yields larger than 10 kg, is 2 percent maximum at a maximum standard deviation of 2.5%. As a rule, however, a general assessment of performance or controlling the milking process does not require this level of accuracy.

One advantage of measuring the amount of milk or the mass flow of milk is that in individual cases, the shape of the milk curve during milking or the total milk yield will allow to draw conclusions on the state of health of the animal.

One problem encountered in milk flow measuring is that milk is a heavily foaming fluid. Foam formation during milking is further intensified by the currently employed milking techniques since as a rule, air is periodically or continually allowed to enter into the milk collection piece and/or the teat cups during milking to discharge the milk. Although the volume of air intake per unit time may vary, it will as a rule be approximately 8 liters of air/minute or even higher. Assuming a maximum milk flow e.g. for cows of approximately 10 or 12 liters of milk per minute in the main milking phase, the air volume to be discharged will roughly be at least approximately 25%, in particular at least 40% or even 50% of the volume flow of milk yield and air intake. And this quite considerable portion is already present during the maximum milk flow phase. Near the end of milking the proportion of air to be discharged will rise even higher due to the decreasing milk flow. Added to this there is the proportion of air entering at the teat cup due to less than tight sealing between the liner and the teat. This proportion can also be roughly estimated at e.g. 10 liters of air per minute. The considerable proportion of air in the air-fluid mixtures to be discharged may thus cause not only individual foam bubbles but substantial formation of foam which considerably impairs in-flow milk yield measurement.

Since the proportion of foam does not readily permit conclusions on mass from the volume, the accuracy of milk yield measuring methods through volumetric methods has its limits. Both the proportion of air in the fluid and the bubble size in the foam are not always even but they depend on a plurality of factors. These factors include, the milk temperature, the milk flow rate, the position and layout of the milk hoses, the type of milking unit, the type of teat liner, the milk hose diameter, the type of milking installation, the vacuum level and the pulse rate during milking, air leakages or air infiltration, the current state of health of the udder, individual differences between cows e.g. due to the lactation stage or the race of the cow, and due to differences in kind and quantity of feeding, etc.

Another problem in measuring the milk yield flow is caused by the periodic milk flow. Unlike measuring volumetric flow in many other applications, milk is drawn periodically. The pulse space and thus also the teat space in the teat cup is subjected to a periodic vacuum such that milk will flow out of the teat approximately at the pulsation rate. The pulse rate typically lies between approximately 30 and 90 at e.g. 60 cycles per minute. Given four teats and identical rates with all of the teats, there will be a milk flow having approximately 60 milk flow pulses per minute. Where the udder halves or the four teats e.g. of a cow are selected variably, the high frequency proportion of the milk flow may increase to reach approximately 240 strokes per minute at a pulse rate of 60. Milk is often conveyed through the milk hoses in clusters such that short phases at maximum milk flow alternate with short phases at minimum milk flow. Determining the actual milk flow is difficult under these conditions.

Due to these influences, measuring a milk flow is found to be difficult since the nature and composition of the foam phase on the one hand and on the other hand also the composition and quality of the liquid phase within one milking process and between milking processes are subject to fluctuations. For example the electrical conductivity of the fluid and the proportion of the foam phase may vary continually since e.g. the fat content may change during milking which will cause fluctuations in terms of the electrical conductivity and the optical properties of the milk. Measuring methods based on measuring these parameters may thus be subjected to not inconsiderable inaccuracies.

DE 30 20 161 C2 discloses a device for milk yield measuring where milk is periodically dammed in a chamber until it is filled to then discharge the content of the chamber. By way of the time required for filling and the volume contained in the chamber the total amount of milk can be summed up and the current milk flow assessed. The achievable accuracy of such measuring devices is high. Owing to the principle, however, periodically operating measuring methods do not allow precise determination of the current milk flow in particular with slight milk flows. Exact information on the current milk flow is, however, helpful at the start of milking and in particular at the end of milking for adjusting the process parameters and for specifying the best time of removal. In-flow measuring may provide better control of the removal process since continuous measuring enables early recognition of the best time for removal.

EP 0 536 080 A2 discloses in-flow milk yield measuring wherein the milk is conveyed through flow channels, and transmission of an infrared light beam through the milk is measured and analyzed. The temporarily dampened or dimmed infrared light beam through the channel as milk is flowing through allows to draw conclusions on the momentary mass flow of milk through said channel. One drawback of optical measuring is for example that small and large foam bubbles may scatter the light beam employed for measuring such that in the presence of a foam portion, not enough light can be measured in transmission or reflection measuring so as to result in measuring errors.

DE 37 37 607 A1 discloses another method and a device for in-flow milk yield measuring. A plurality of electrodes positioned one above the other is provided to firstly determine the electrical impedance or electrical conductivity of the liquid and air mixture on the respective levels by means of the electrodes. In the bottom region, a reference conductance of the liquid currently passing is measured. On the basis of each height value the stepped level profile of the specific impedance is calculated by means of the reference conductance. The flow velocity of the draining off liquid is known for known impedance profiles from calibration measuring such that the stepped level profile permits conclusions on the flowing mass of the milk.

A device operating on this principle has become known wherein a plurality of approximately 60 electrodes is positioned one above the other. To cover a wide range of heights and thus of measuring, the electrodes are spaced apart from one another in the vertical direction by a specific electrode-free distance. The actual condition at measuring cannot be detected in said electrode-free area. Given a distance of e.g. 1.5 mm, this may mean a measuring error of nearly 1.5 mm, which with slight milk flows at low fill heights of a few millimeters may result in correspondingly large measuring errors.

Due to this principle, this known device is very complex in terms of mechanics and electronics since a large number of electrodes must be installed and individually selected electrically. It is another disadvantage that despite the high number of employed electrodes the milk flow is only evaluated in steps, thus causing inaccuracies.

It is therefore still a major challenge to integrate a sensor in the milk flow offering satisfactory measuring accuracy at a reasonable price for farmers.

SUMMARY OF THE INVENTION

It is therefore the object of the present invention to provide a device and a method for determining the quantity or the mass flow in particular of a foaming liquid, so as to provide adequate measuring accuracy with simple means.

The device according to the invention is in particular suitable for measuring the mass flow in particular of a foaming liquid. The device comprises at least one measuring device. The measuring device comprises at least two electrodes and at least one electrical means for generating an electrical magnitude, and an analysis means. The electrical means is connected substantially parallel to the first electrode, and the second electrode is electrically connected with the first electrode via the analysis means. Preferably the analysis means is electrically mounted between the first and the second electrode. The analysis means is in particular electrically connected with the first electrode on one side, and on the other side electrically connected with the second electrode. The electrical means is connected in particular with two spaced-apart spots on the first electrode such that it is connected in parallel to the first electrode.

The invention has many advantages. The invention is in particular suitable for determining the quantity of a foamy and/or foam-producing liquid such as milk.

The device according to the invention is easy to clean, to disinfect and to maintain since it does not require any moving parts. The structure of the measuring housing may be very simple.

Preferably the fluid flow is measured in-flow in particular during the milking process. To this end, a measuring section is preferably provided at the device.

An additional advantage is the possibility which the inventive device offers, of in-flow measuring the intermittent milk yield with high precision during milking. The pulsating milk flow is highly demanding in respect of the measuring principle which demands are fulfilled to a high degree in the present case.

It is another significant advantage of the device according to the invention and the specific embodiments described above that the entire quantity of flowing fluid will always be measured including the foam portion. For example when the milk flow lessens and thus the milk at the electrodes drains off more slowly due to the surface tension (e.g. due to the fat content), the device according to the invention is still capable of correctly measuring the milk quantity or the milk flow since what is measured is the density, not the fill height or the volume.

With a device according to DE 37 37 607 A1 described above, however, the fill height measured may be higher than it actually is with the milk draining off the electrodes slower which will create a measuring error. An apparent milk flow is measured where in fact a smaller amount is present. This milk "adherence" is very frequent in milking since the milk flows in surges such that a lessening milk flow can occur in every pulse cycle.

With the device according to the invention adhering forces of the fluid at the sensor have hardly any influence since the density is measured, not the fill height.

It is another significant advantage of the invention in all of the embodiments that continuous measuring is possible, not related to the number of analysis electrodes as is the case with a system according to DE 37 37 607 A1. Namely, the resolution capabilities of the known devices is reduced further with the measuring area not being utilized to the full. To achieve a satisfactory in-flow measuring accuracy, these devices must provide an adequately large flow-through height such that the measuring housing must be configured comparatively large or high enough. This is not required with the device according to the invention since the resolution generally is not related to the structural configuration of the electrodes. A device according to the invention can thus be optimally adjusted to the milk flow of a specific species (e.g. cows or ewes), so as to achieve optimal resolution for said species both for maximum milk flows and for minimum milk flows.

Preferably the measuring device is positioned in a measuring section that may be provided in a housing of the device. The housing preferably comprises at least one inlet and at least one outlet. Between the inlet and the outlet there is provided a measuring section in which the liquid to be measured is conveyed e.g. in a channel.

In measuring, the height of the flowing liquid is captured not in steps but continuously. Measuring accuracy can thus be enhanced.

According to the invention it is not the fill height that is measured but an integral density profile. Due to the principle applied, individual calibration for each cow or for the race of the cows is not required.

The mass flow is derived from the density profile. The calibration parameters used are those including the influences specific to the devices. For example one takes into account which flow velocity will ensue from which density profile.

The response time of the device is determined by the response time of the electronic analysis components which generally allows fast milk flow measuring.

The inventive measuring principle is realized in all of the embodiments preferably by potential measurement in that potentiometric measuring is carried out. To one electrode, e.g. the first electrode, a potential is applied which drops nearly linearly along the electrode, at least when cross-section and material properties along the electrode are constant.

The first electrode in particular is spatially considerably extended and it is in particular elongated in shape. The first electrode considerably extends in particular perpendicular to the direction of flow.

In measuring, the first electrode is wetted with the foaming liquid up to a specific height. Wetting occurs both with the liquid phase and a possibly present foam phase. Therefore, a potential curve is introduced into the fluid related to the height and the quality of wetting. The electrical means is connected in particular with two spaced-apart spots on the first electrode such that it is connected in parallel to the first electrode. The two spaced-apart spots on the first electrode may be positioned in particular at two ends, in particular at the two ends of the first electrode.

The second electrode preferably also extends spatially and it is in particular elongated in shape, or else it may be configured as a spot electrode or a contact electrode to the fluid to be measured.

Now, the second electrode is positioned at a specific (horizontal) distance from the first electrode. The foaming liquid between the two electrodes overall forms an impedance. The level of impedance is integrally formed by the fluid between the electrodes. The higher the proportion of liquid, the smaller the impedance, and the larger the foam proportion present in the volume between the two electrodes, the larger the impedance. The impedance is also related to the horizontal distance.

Where the fluid is layered e.g. between the two electrodes such that a liquid layer is present at the bottom and a foam layer on top, the total impedance is an integral composition of both. In this simplified case, the liquid and foam portions can be approximately considered as a connection in parallel. Although the specific impedance of the foam portion will be considerably higher than the specific impedance of the liquid portion, both portions will contribute to the total impedance. Therefore the total impedance is representative of the density between the electrodes.

Preferably, however, what is measured is not the impedance between the electrodes but the potential. The potential is introduced into the fluid to be measured by the first electrode. Where both electrodes are covered in pure liquid from bottom to top, the first electrode will apply a gliding potential between e.g. 0 and 60 mV to the liquid. A locally homogeneous liquid between the electrodes will thus yield the integral mean value of 30 mV between the two electrodes. With both electrodes wetted up to half their heights, a potential gliding above the height of the electrode between 0 and 30 mV is applied. Thus, an integral potential of 15 mV will be measured between the two electrodes.

Where a layered fluid is present, the integral measuring will cause the foam portion to be directly measured as well. Due to the principle applied, the measuring method allows measuring of foam-containing liquids. The draining-off characteristics known from calibration allows to infer the flowing quantity of fluid from the integrally measured density.

Since the measuring principle in this configuration is substantially based on measuring an (electrical) potential, an electrical power flow through the fluid which would be significant in terms of the animal physiology is avoided. Differently therefrom, the known prior art devices and methods perform measurements of the electrical or optical impedance.

The electrodes are configured such that the source resistance is considerably lower than that in the liquid phase of the measured fluid. This will ensure a "linear" potential curve above the height of the first electrode, independently from the fill height of the liquid phase or the foam portion.

It is expedient to provide the impedance between the first and the second end of each electrode considerably smaller than the impedance between the electrodes at maximum level of the liquid phase of the fluid. This will ensure that the electric potential forming around the electrode is not significantly influenced by the fluid. The measuring accuracy is thus enhanced. For example an electrode having an electrical impedance of e.g. 100 milliohms may be employed.

As stated above, preferred specific embodiments of all of the above described configurations include as the preferred electrical means a voltage source or a voltage generating means. The electrical magnitude applied in parallel to the first electrode will then be electrical voltage. By means of the voltage source, an electrical voltage is applied between the first end and the second end of the first electrode. Preferably the analysis means comprises a voltage measuring means.

It is advantageous that for measuring, the voltage source applies a voltage in the range of millivolts, in particular in a range up to approximately 100 mV, preferably values up to approximately 5 mV, 10 mV, 20 mV, 30 mV, 40 mV, 50 mV, or 60 mV.

Preferably the voltage source generates an alternating voltage to protect the electrodes from wear, and to prevent electrolytical residue which might cause errors in the measuring results. The frequencies of the alternating voltage preset by the voltage source will be in an adequate range. A suitable frequency is e.g. 1 kHz but other frequencies are also conceivable.

The voltage measuring means preferably comprises a high internal resistance as is usual for voltage measuring means. Preferably the internal resistance is considerably larger than the electrical impedance typical of the examined liquid between the first and the second electrode at minimum liquid level.

Measuring is also conceivable where instead of the voltage source, a (constant) power source is used wherein a power sensor is provided instead of the voltage sensor, the electrical magnitude being the electric current.

With this configuration it should be noted that impedance will change with temperature. This means that a constant power source must compensate for any varying drops in voltage. Preferably a temperature sensor is provided to capture the temperature of the flowing liquid or of the electrode.

The device according to the invention achieves high reliability since no wearing parts and no moving parts are present. A particularly high measuring accuracy is preferably aimed for to obtain the approval of the milk control associations or of ICAR. The device according to the invention thus allows precise measurements of the flow. Any investments required in terms of machinery or finances can be saved later on in terms of time and money for regular milk yield checks.

The measuring signal is preferably captured in specific, predetermined or selectable time intervals such that quasi continuous measuring will be present.

It is furthermore preferred that the structure and quality of the device is such as to achieve a high measuring rate. Preferably the measuring rate is high enough to enable adequate speed for measuring and processing data even with high milk flows of e.g. 10 or 12 l/min.

The measuring principle allows accurately measuring the mass flow in a wide measuring range from small to large flows without having to calibrate the actually measured fluid. The accuracy of measuring is not related to the conductivity of the liquid if only a minimum conductivity is present which is given as a rule even for simply distilled water and thus all the more for tap or well water, milk, etc. Thus the conductivity of milk, common tap water and other liquids is in a range well suited for measuring.

Systematic variations in the optical, electrical, or physical fluid properties during the measuring process are inherently taken into account. For example, variations in conductance during milking between 3000 and 6000 µS/cm will not adversely affect the measuring result although the conductance has changed by a factor of 2. It is not required to continually perform calibration or compensation for the fluid conductance.

Due to the measuring principle, measurement will be largely independent from the liquid conductance (while being 1 µS/cm), from temperature and from the pressure in the measuring vessel. Generally speaking, the measuring principle is conceivable also for small and minute conductivities of the analyzed fluids. It should be considered that simply distilled water has a conductance e.g. of 2 µS/cm, tap water, a value of approximately 20 to 500 µS/cm and milk, in the range of approximately 2000 to 8000 µS/cm. All of these conductance values allow reliable measuring.

This offers the advantage that for the common, regular checking of the measuring device at the farm e.g. clear water may be used as the testing medium. Unlike other, conventional milk yield measuring devices, the device according to the invention does not require any special calibration solution at a defined conductivity or a defined transparency, to obtain reasonable measuring results.

Generally, however, the independence of measurement from fluid conductivity may cause inaccuracies as the mass flow lessens and only foam is present in the measuring section. This is because due to the independence from the precise conductance value, the measuring device cannot distinguish whether pure liquid or pure foam phase is flowing in the measuring area. With a pure foam phase present in the measuring area, the same potential will be measured as for a pure liquid phase. The same signal would be applied although the real mass flow would be considerably different.

The problem of measuring errors will not occur where only liquid phase or a portion of liquid phase and a portion of foam or a portion of mixed phase is present. Owing to the measuring principle, these kinds of influences are automatically taken into account.

Prevention of the measuring inaccuracies indicated above e.g. in the presence of pure foam phase, is possible with a number of measures.

In the most simple cases the problem is neglected, employing only milk flow values from milking phases with a milk flow exceeding a specific level e.g. in the main milking phase. To this end, the measuring area can be limited as appropriate to exclude measuring errors. This may include a time factor such that past the maximum, measuring is only continued for a specified time. Measurement will preferably continue as long as an adequate mass flow is present to wet both of the electrodes with liquid fluid phase.

It is also conceivable to connect between the two electrodes, parallel to the measuring section a specific, additional impedance which can thus avoid such measuring errors. Such impedance will "simulate" a basic height of liquid phase. Then if for example only foam is present between the electrodes, the total electrical impedance between the electrodes is accordingly higher such that through the additional, parallel impedance the larger portion of the potential will drop. The value measured will therefore be more accurate. It is a drawback though that a systematic error is present since said additional impedance is only adjusted to a conductance which may vary considerably during milking. Then again, there is the advantage of reduced risk of contamination in such a construction.

It is possible to measure the current conductance at another position and to continually adjust the impedance accordingly. This allows automatic recognition whether only foam phase is present and measuring errors can thus be avoided.

For all of the configurations it is preferred that at least one, preferably both of the electrodes extend over the entire height of the measuring slot of the measuring surface, in particular the height of the measuring section or the flow channel or the housing. Preferably the electrodes protrude from the measuring chamber so as to enable contacts protected from being influenced by the liquid to be measured.

The structure and configuration of the two electrodes is preferably such that in operation the liquid phase of the fluid can come into contact with both of the electrodes in a bottom region. The dimensions of the measuring section are preferably such that the top ends of the electrodes will only be contacted with the highest, maximum flow.

Another option of preventing said inaccuracies is realized in a preferred specific embodiment in which the two electrodes extend into a hollow in the bottom area, preferably positioned in the region of the measuring section. In measuring, the first and the second electrode will be electrically connected with the fluid in the hollow or in the recess.

The structure and the flow guidance are preferably provided such that the liquid phase of the fluid or of the foaming liquid to be measured will always be naturally present in said hollow. In this way there will be continuous calibration relative to the liquid phase. Then, if only foam phase should be present in the measuring area above the hollow, a potential is measured between the electrodes which includes the density.

The hollow will ensure that even with slightest milk flows both of the electrodes are electrically connected with one another through a liquid phase of the fluid and no measuring errors can ensue. Based on the different electrical conductivities of the liquid phase and the foam, the electrical connection of the two electrodes through the liquid phase of the fluid in the hollow will ensure that pure foam will not be regarded as a pure liquid phase.

The depth of the hollow or recess is much smaller than the height of the channel. The ratio may be larger than 1:5 and lies e.g. in the range between approximately 1:10 and approximately 1:30, at approximately 1:20.

Preferably the hollow comprises a drain in one specific embodiment. With the drain being constantly open during measuring there will be continuous exchange with the measured fluid such that the hollow will always contain representative fluid. Otherwise, depending on the configuration of the hollow and the properties of the measured fluid there may only be minor fluid exchange during measuring which may cause measuring errors.

A recess without drain is also conceivable. Then, exchange occurs e.g. by way of the fluid in the recess being entrained.

If a drain is provided it may be closable. The drain may for example be closed during measuring, in particular where fluid exchange is sufficient. For cleaning the device, the drain may then be opened to allow for easy cleaning of the hollow.

The drain may for example be formed of a small discharge channel connecting the hollow with the discharge. Or else, the drain of the hollow may be connected with a separate outlet or coupling. With the hollow and the device being configured such that a specific portion of the fluid is drained off through the hollow, said drain can also be used for drawing off a representative sample e.g. for precisely analyzing the constituents to examine the milk quality during milking. For this purpose for example 0.5% or 1% or an adjustable quantity may be drained off.

One significant advantage of a drain is that the recess empties itself at the end of milking to ensure that after rinsing, no residual rinsing water can enter the milk of the following cow.

Preferably the housing has a channel provided in it at least part of which is positioned in the region of the measuring section.

A preferred embodiment of the invention provides at least one electrode configured as a device extending into the channel.

Preferably at least one electrode is shaped e.g. as a rod or a tube. An electrode can e.g. be configured as an electrically conductive rod. It is also conceivable that at least one electrode is configured as a round, oval, angular, in particular quadrangular rod, or as a flat or curved plate. Selecting this shape of electrodes causes measuring to be reliable and manufacture to be cost-effective.

It is also conceivable to incorporate one electrode or two or more electrodes into the channel walls. In this way, easy cleaning and maintenance will be achieved and high reliability of the measuring device. Moreover, flow in the channel will not be adversely affected.

All of the configurations preferably provide a flow restriction in the housing in particular in the region of the measuring section. Said flow restriction may be a flow resistance. Preferably the flow restriction is configured as a diaphragm. It is also possible to provide a narrowing of the flow channel over a specified length.

The diaphragm in the sense of the present application is a resistance to fluid flow preferably formed through a narrowing of the clear flow cross-section of the measuring section wherein said clear flow cross-section is preferably configured as a channel.

The flow restriction is provided to dam the flowing fluid. Preferably the measuring device or the electrodes is/are positioned in the vicinity of the flow restriction.

A diaphragm is already known from a device according to DE 37 37 607 A1. Unlike said device, the diaphragm or the discharge slot according to the invention can be made considerably wider since the resolution of the measurement is not related to the fill height. The known device having a plurality of electrodes positioned one above the other provides for a stepped resolution such that a high measuring resolution can only be achieved above a fill height corresponding to a multiple of the step spacing. In the present invention, however, the resolution is preferably independent of the slot width such that a wider slot can be provided.

This will also considerably reduce the risk of the discharge slot stopping up with foreign particles. Damming of the fluid in front of the discharge slot in conjunction with the discharge stopping up will show a higher flow rate than actually exists. This is why the known device according to DE 37 37 607 A1 provides for sieves in the inlet region which require regular cleaning. This considerably complicates permanent use if the known device is firmly mounted to a milking appliance since a lot of additional maintenance and cleaning is required.

This drawback is avoided by the specific embodiment of the device according to the invention. The resolution is not limited to steps specified by the measuring electrodes. The principle of capturing stepless measured values allows to obtain high accuracy. The stream width and the outlet cross-section or the discharge slot can be configured larger than in the device known from the prior art. This has the considerable advantage that foreign matter or foreign particles possibly present in the milk are drained off, not stopping up the flow path. Such foreign particles may be e.g. straw, bedding spread or feeding remnants such as e.g. corn seeds.

Feeding remnants or other foreign bodies such as straws can e.g. be sucked off the floor before the vacuum is turned off when a teat cup falls off or is kicked off. Inadequate teat cleaning also may let foreign bodies get into the milk such that they may then stop up the discharge slot, in particular if it is too narrow e.g. for corn seeds to fit through. Upstream filters can be omitted.

Preferably the cross-section of the flow restriction or the diaphragm is variable. Particularly preferably the diaphragm is exchangeable. This allows to adjust the magnitude of the hydrodynamic resistance. The advantage of this is that even for smaller maximum milk flows (e.g. when milking the udder quarters separately or for animals whose maximum milk flow is generally low such as ewes or goats) the achievable measuring accuracy and measuring resolution is as high since the entire measuring area height will be used. Where the available measuring area of the device is optimally utilized for each measurement, a particularly high measuring accuracy is achieved.

Preferred embodiments provide at least one electrode formed by, or integrally with, a housing element. For example, one electrode or both of the electrodes may be provided in the wall or on the wall of the channel. Also, at least one electrode may be positioned at the flow restriction or at the diaphragm.

In the case of a diaphragm used as flow restriction, one electrode each may be provided on opposite sides. Then it is preferred to predefine or at least influence the width of the diaphragm aperture by the two electrodes. Preferably both of the electrodes are provided at the diaphragm.

It is a considerable advantage to have at least part of the flow resistance formed by the electrodes. Then the electrodes and the diaphragm will form one integral component. For example one electrode is incorporated into the surface of the flow resistance. This measure will achieve a still further simplified structure.

In preferred embodiments at least one electrode is positioned upstream of the diaphragm or of the flow resistance.

One electrode may expediently be placed in a region dammed by the diaphragm, preferably very close to the flow resistance so as to achieve the most precise determination of the mass flow possible. The second electrode may be positioned somewhat upstream of the diaphragm, or else it may be physically connected with the flow resistance.

In other configurations no cross-section restriction is provided at least in the region of the electrodes. The measuring area in which the electrodes are positioned will then be formed preferably as a simply multiangular channel. The preferred cross-section is in particular round or else oval in shape. Then with the electrodes incorporated in the channel walls, the mass flow of the flowing fluid is determined without requiring a cross-section restriction. Such a configuration offers advantages in particular in respect of foam discharge.

Stationary foam not transported off by the liquid phase may, if it entirely fills the clear space above the liquid phase, press down on the liquid phase and thus accelerate the flow rate such that the flow velocity is no longer identical with the flow velocity. This is why devices are preferred where the foam portion is mixed in and conveyed off.

Where e.g. a triangular channel is provided with one tip pointing downward the hollow described above is not necessary since the bottom region will as a rule contain a liquid phase.

To stabilize the pressure ratios and to avoid effects from changing pressure ratios acting on the flow velocity and thus on the measuring accuracy, it is preferred to provide for pressure compensation above the device.

A device for passive or else active pressure compensation above the measuring device will achieve that the flow velocity is substantially determined by gravity wherein considerable influences may be exercised by the mass flow itself. Such a device for pressure compensation will achieve that in the entire measuring area the flow velocity will correspond to simple calibration.

Without a pressure compensation between inlet and outlet of the device the flow velocity may depend on the current pressure situation. This is because when, with equal density distribution above the height in a first example, the pressure differences above the measuring section are higher than in a second example, the milk will flow faster in the first example than in the second. For example if additional air enters a teat liner, the milk flow rate will accelerate due to the air intake. Moreover, pressure may build up locally above the measuring section, increasing the flow velocity.

Since as a rule, velocity will not be metered separately but calibration measurements are referred to, and velocity is influenced by the additional stream of air, the mass flow can then no longer be accurately determined. The mass flow determined by way of the calibration curve will then no longer match the current mass flow. However, constructive measures may reduce or avoid this influence.

For measuring it is therefore advantageous if the pressure ratios present are substantially constant. Where the influence of pressure difference is known, measuring said pressure difference above the measuring section can be sufficient so as to calculate the mass of the momentary flow from the height profile of the density and the pressure difference. This is, however, more complex.

Preferably therefore, a pressure compensation between inlet and outlet is employed to stabilize the pressure above the measuring section. In a specific configuration of the invention the pressure above the device is stabilized by means of an active pressure generating means.

Preferably, however, a passive means, i.e. a bypass is provided which is positioned and structured such that substantially only gaseous phase, meaning air, but no foam or liquid phase is discharged through the bypass. Bypasses are in particular suitable to avoid back pressure. The bypass is particularly preferably provided in the vicinity of the inlet, in particular in front of the measuring device or the electrodes.

Due to the bypass, the device for measuring a mass flow does not represent a substantial flow resistance. The additional pressure supply ensures that the pressure near the inlet is approximately the same as in the milk pipeline in front of or after the device for measuring the mass flow. In this way no pressure drop will occur within the device which might affect the flow velocity of the fluid or the milking process.

Preferably the bypass comprises a bypass coupling to keep the device pressureless. The coupling for the bypass may be configured e.g. as a bypass nozzle.

Preferably the bypass coupling further serves to directly discharge a large proportion of the milkless air stream. Discharging a large proportion of the air causes a reduction in foam formation within the measuring section. Discharge of air furthermore prevents adverse effects on the flow velocity. The bypass coupling and the inlet together may serve as a cyclone collector, thus establishing a fluid connection with the device outlet.

The device may furthermore comprise a steadying section for steadying and/or smoothing the flow before the measuring sensor. In this way the measuring accuracy can be enhanced further.

In all of the embodiments described above at least a third electrode may be provided which in preferred embodiments extends into the measuring section from above.

By means of the measured values of a third electrode which is employed additionally to the second electrode as a sensor or a detector, the values from said two sensors can be averaged to still further enhance accuracy. The second and the third electrode can than be sensed alternating or simultaneously.

With the third electrode extending downwardly from above not over the entire height but only over part of the height from above, the third electrode can detect a foam layer which might come to be deposited on top. With the measuring results from the second and the third electrode being different one may conclude that the second electrode is surrounded by liquid phase at the bottom while there is foam in the upper portion which the third electrode substantially detects. By way of a corresponding analysis, inaccuracies in measuring may be avoided without a hollow or a recess.

In a preferred specific embodiment of the invention at least three electrodes are provided with an electrical magnitude applied to the first electrode. A first measurement value is sensed between the first and the second electrode and a second measurement value is sensed between the first and the third electrode. Now when the second and the third electrode are spaced apart in the direction of flow, an inclination of the device can be determined based on the first and the second measurement value. To determine the angle of inclination the device is partially filled with a fluid in particular before the actual measuring operation and preferably it is closed so as to prevent the fluid from draining off. An inclination can then be inferred from the measured values. It is also possible to determine the three-dimensional inclination with a total of four electrodes suitably positioned.

After determining the angle or angles of inclination this value may be employed for corrections to calibration. It is also conceivable to refer back to a suitable calibration curve stored in the device memory by means of the determined angular value. The overall reliability and accuracy can thus be enhanced further.

Preferred specific embodiments of all of the specific embodiments described above may provide for a separate inclination sensor. An inclination sensor as known from the prior art is suitable. The signal or signals of the inclination sensor are used for selecting a suitable calibration curve from a number of calibration curves, or for selecting a fixed or flexible correction parameter for the measurement values.

An incorporated separate inclination sensor offers the advantage that the alignment of the device can be checked at fixed or irregular intervals. Said checking may be performed once in a period such as once a week or a day, or preferably at least once per measuring process. The position may be determined during measuring in that as each measurement value or every nth measurement value is captured the signals from the inclination sensor are taken into account.

A particularly preferred embodiment provides a measuring chamber for the inclination sensor mounted at the device. The inclination sensor may operate according to the measuring principle described above. Then the measuring chamber for the inclination sensor comprises three and preferably at least four electrodes. The electrode configuration is provided such that an inclination angle can be determined at least in the direction of flow of the fluid to be measured. It is conceivable to provide one common analysis means for the measuring device for determining the quantity or the mass flow of the fluid and for the inclination sensor.

Another embodiment of the invention provides that measuring is as a rule not performed in-flow but by continuously determining the quantity of fluid filling into a measuring vessel collected in particular during milking. This configuration provides that the measuring vessel collects the fluid at least for a time period. After filling the measuring vessel, the vessel may be drained. A periodic filling and draining of the collected fluids during the measuring process is also conceivable, in particular if the volume of the vessel is not sufficient for intermediate storage of the entire quantity of fluid for one measuring process.

In one embodiment with a measuring vessel the electrodes extend over the entire height of the measuring vessel utilized for measuring. Preferably the cross-section of the measuring vessel is nearly equal above the height. Otherwise calibration may be performed relative to the measuring vessel geometry.

In this configuration the analysis means is suitable for determining a mass of the fluid in the measuring vessel. Due to the difference of the fluid content in the measuring vessel between a second point in time and a first point in time, the quantity of fluid added during said interval can be inferred. Dividing by the time period will result in the mass flow of the fluid. Since the frequency of measuring can be very high since the time gap required between a first and a second measurement is small, a continuous or at least quasi continuous determination of the quantity or the mass flow can be performed.

With the first measurement of the quantity M1 performed at a time T1 and the second measurement yielding a measuring result M2 at a time T2, the result will be the mass flow of $(M2_{(T2)}-M1_{(T1)})/(T2-T1)$. Given a time interval of e.g. 1 second, a milk flow of e.g. 120 g/min. will yield a mass deficiency of 2 grams which will allow a determination of the milk flow at more than adequate accuracy. A higher frequency of measuring will result in a correspondingly higher resolution.

In any case, an embodiment with a measuring vessel provides that always the entire quantity of fluid will be measured (from the last draining of the measuring vessel). Additionally the current mass flow can be determined by establishing the difference. The measured values may be smoothed e.g. by employing the moving average method or another filter method.

Employing a measuring vessel for measuring is in particular preferred if during measuring the fluid to be measured is analyzed. For example during milking a portion of the milk yield may be diverted and analyzed online. Milk not meeting specific criteria may be discarded after milking without getting into the bulk milk tank. This may be done e.g. for milk not meeting predefined requirements e.g. where the cell count exceeds a specific threshold value, or clots have been detected in the milk, or inhibiting substances have been detected in the milk, etc.

Determination is preferably performed continuously to allow immediate determination of the milk flow and thus immediate control of the milking operation. Then, the mass flow i.e. the quantity of liquid per time can be determined.

Also for in-flow measuring, a vessel for receiving and intermediate storage of the fluid to be measured may be provided for performing a total measurement in addition to in-flow measurement, or for intermediate fluid storage until measuring results on the fluid constituents are available, and the like.

All of the configurations described above include the considerable advantage of easy cleaning of the device. The measuring principle allows a simple structure of the device which in addition to easy cleaning also allows easy maintenance since no fragile or mechanically moving parts or sensitive optical components are required.

In a preferred embodiment the invention comprises a configuration having at least two devices as described above.

To obtain further information on the mass flow or the fluid, two or more devices for mass flow measurements may be provided. Preferably two or more devices as described above are connected in series. A connection in parallel is also conceivable, in particular with a specified or known split ratio between the individual devices. With information on the volume of the mass flow at different positions of the fluid line, interruptions due to contamination (blocked clear passage of the channel due to deposits of straw, corn seeds, etc.) can be established and possibly computed out of the measured results, or a maintenance signal can be emitted.

Furthermore the invention relates to a configuration for measuring at least two quantities or mass flows in particular of a foaming liquid. The configuration comprises at least one electrical means for generating an electrical magnitude, and at least one analysis means. At least two devices having measuring sections or a measuring vessel each and at least two electrodes each are provided. The electrical means can be connected alternating substantially parallel to the first electrode of the first device and substantially parallel to the first electrode of the second device. Preferably each device comprises a separate housing.

With the mass flow being measured at least in two different places, comparison of the measurements in the different places along a fluid line will allow drawing inferences on the structure of the fluid and on the mass flow. A time correlation of the mass flows determined in different places suggests itself for determining at least one magnitude characterizing the structure of the fluid. For example the flow velocity can be inferred from the data. Abrupt, partial clotting of the discharge slot or the measuring area may also be captured and computed out of the measuring results. In addition, a comparison of the two measuring results allows conclusions on the measuring accuracy, in particular in terms of error range. Also, information on the milking process may be gathered.

According to another inventive idea the invention relates to a configuration for measuring at least two quantities or mass flows in particular of a foaming liquid. At least one electrical means for generating an electrical magnitude and at least one analysis means are provided. Furthermore at least two devices having a measuring section each or a measuring vessel each are provided. The measuring section or the housing comprise at least two electrodes each. Therein the analysis means can be connected alternating between the first and the second electrode of a device and between the first and the second electrode of another device. Preferably each device comprises a separate housing.

In a preferred specific embodiment exactly one electrical means and exactly one analysis means are provided for at least two devices. It is also possible to provide 3, 4, 5, 6, 7, 8 or more devices in total with exactly one electrical means and exactly one analysis means. It is also possible to provide one electrical means for a number of devices and for each device one analysis means each. It is also possible to provide one analysis means for a number of devices and for each device one electrical means each.

In a preferred specific embodiment at least two devices are positioned in parallel provided and e.g. optimized for different through-flows.

The configuration allows to determine in particular two or more quantity or mass flows separated from one another in terms of structure and space. Each device of the configuration serves to determine independent quantity or mass flows, e.g. from two different teats of one animal to be milked.

For teat-individual measurement, a corresponding number of devices is preferably provided. For example for measuring the quantity of milk flow from goats, two devices, from cows, four devices for individual measuring of each quarter may be provided.

For measuring the milk quantity or the milk mass flow it is e.g. possible to provide a number of milking places with one configuration in total. Thus, one milking parlor may have each milking place or part of the milking places equipped with a measuring section or a measuring vessel while (central) analyzing electronics capture the measured results. A milking carousel may thus be equipped with one electronic analysis device only.

A preferred specific embodiment of the inventive configuration provides for a first device having a smaller flow cross-section and a second device having a larger flow cross-section. The device having the larger flow cross-section may be additionally connected for high milk flows to increase the measuring area and to further enhance accuracy.

The inventive method for measuring a mass flow of a fluid, in particular a foamy liquid such as milk, includes the following method steps: introducing an electrical magnitude in the mass flow of the flowing fluid by means of a first electrode, measuring a generated electrical magnitude in the fluid between the first and a second electrode, and determining the mass flow by means of the captured signal. The preferred electrical magnitude applied to the flowing fluid is a potential.

For measuring the fluid may be dammed by means of a diaphragm and the density profile measured in the dammed area and the mass flow inferred. Where the hydrodynamic properties of the diaphragm, the measuring section and the housing are known, the mass flow can be computed by means of the density profile of the fluid. Inference is particularly easy through a calibration measurement.

The applicant points out that they reserve the right to apply for separate protection directed at a device and a method for measuring the quantity of a foaming liquid and/or a device and a method for measuring a mass flow of a foaming liquid and in particular a foamy or foam-forming liquid. Specific configurations may provide for such a device or such a method to comprise individual or several of the features described above.

Further advantages, features and configurations of the invention will now be described in the following embodiments with reference to the figures. These show schematically in:

DETAILED DESCRIPTION OF THE PREFERRED EMBODIMENTS

Figure 1:
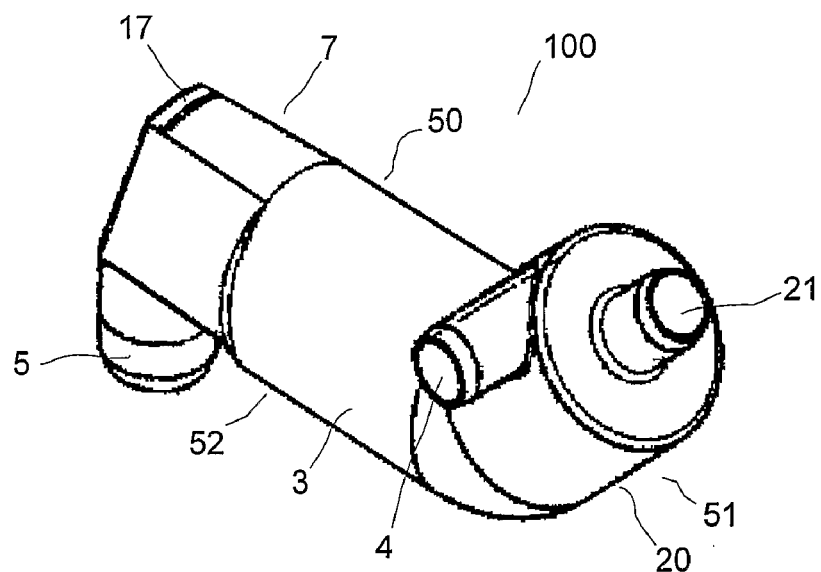
FIG. 1 a device according to the invention for measuring a mass flow in a three-dimensional, perspective view with a diaphragm inserted.
Figure 2:
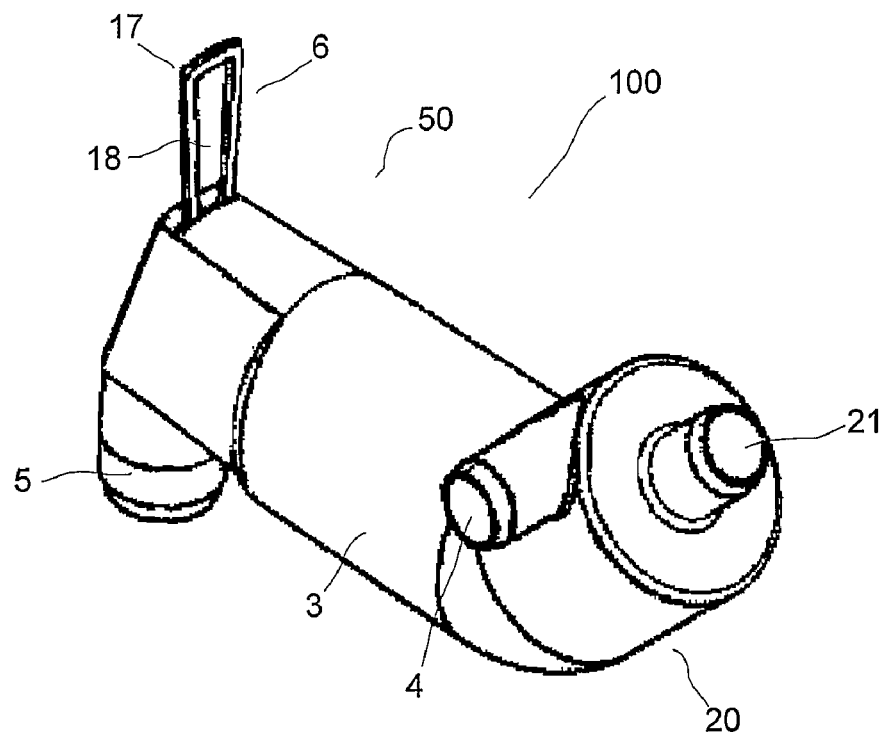
FIG. 2 the device according to FIG. 1 with the diaphragm pulled out.

The FIGS. 1 and 2 show a first embodiment of a device 100 according to the invention in a perspective view for measuring a mass flow of a fluid 1, in particular a foam containing or foamy liquid or a foaming liquid such as milk. In the vicinity of the inlet 4 of the housing 50 a pressure compensation nozzle 21 is provided to remove air. The inlet 4 leads tangentially into the housing 50 such that the fluid rotates while running into the housing. Furthermore a channel 3 is provided subsequent to the inlet 4.

A measuring system 7 is positioned in the channel 3 in front of a diaphragm 17 in this embodiment with said diaphragm 17 being positioned upstream in front of a drain 5. The diaphragm 17 serves as a flow resistance 6 (see FIG. 2). Preferred embodiments provide that the diaphragm can be inserted (see FIG. 1) or exchanged (see FIG. 2) as needed. Exchanging the diaphragm 17 allows to adjust the flow resistance to different conditions since e.g. in milking ewes or goats the maximum milk flow is considerably smaller than in milking cows.

The diaphragm 17 has a trapezoidal opening cross-section 18 which increases upwardly. The diaphragm 17 predetermines the magnitude of hydrodynamic resistance of the flow resistance 6. The flow resistance is adjustable by changing for example the clear opening cross-section and its conicity. The air removal device or bypass nozzle 21 serves to maintain the entire measuring device substantially pressureless by removing a portion of the air contained in the fluid whose mass flow is to be determined.

Figure 3:
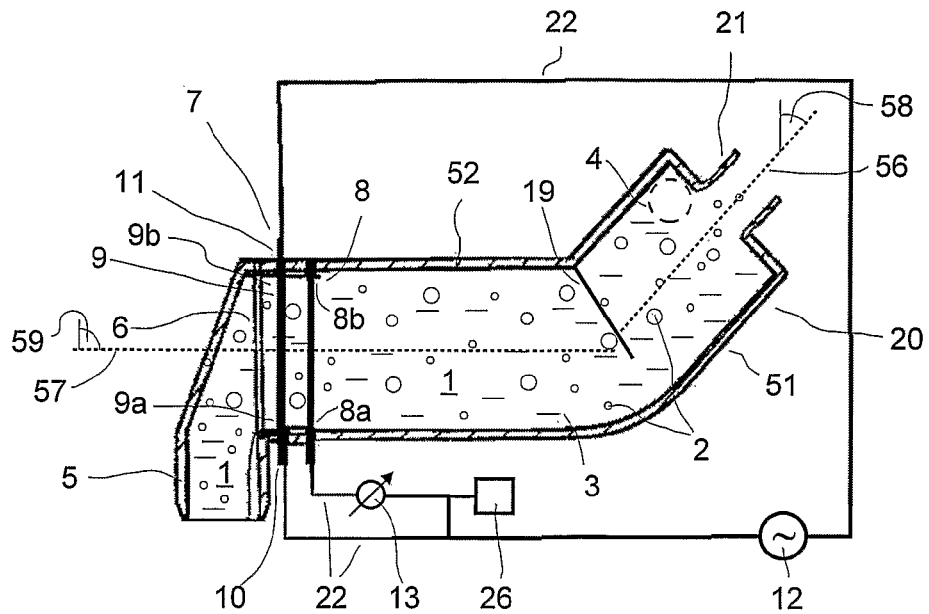
FIG. 3 an inventive device in longitudinal section.

FIG. 3 shows a device 100 according to the invention for measuring a mass flow in longitudinal section with the channel 3 which comprises an inlet 4 (see FIG. 1) and an outlet 5 and through which a fluid 1 flows which contains a foam portion 2. The inlet 4 is incorporated in a cyclone collector 20 through which gas or air can be partially removed via the bypass nozzle 21 or the air removal device 21.

The fluid flows into the housing 50 in the inlet region in a tangent line. The fluid flow lays against the housing element 51 which is round in shape and which serves as a cyclone collector 20. The heavier liquid phase is urged outwardly while at least a portion of the gaseous phase 2 accumulates in a central area and is discharged via the bypass nozzle 21. The bypass nozzle is positioned centrally at the end of the housing element 51 which is cylindrical in shape there, connecting the first element of the housing 50 at which the inlet 4 is provided via a bypass line with the second end of the housing 50 where the outlet 5 is provided so as to establish a pressure balance between inlet 4 and outlet 5. This serves to maintain the measuring device 100 per se pressureless such that the established flow velocity of the fluid is substantially not based on pressure differences. Increased pressure differences might otherwise be caused e.g. by air infiltration at the teat liner. Overall, a bypass permits an increase in reproducibility.

The housing 50 comprises a first element 51 and a second element 52. The first element of the housing 51 is inclined to the horizontal in the region of the inlet 4. In this embodiment the angle is approx. 45° to the horizontal. The second housing element 52 is also inclined to the horizontal so as to support the flowing movement. The angle of inclination is smaller though and related to the actual conditions. As a rule the angle will be smaller than 30°, preferably smaller than 15°. Good results have been achieved with an angle of inclination of 5°.

A center axis 56 (the dashed line) through the first housing element 51 or the first section of the housing 50 is inclined relative to the vertical orientation by an angle 58 which in this embodiment is approximately 45°. A center axis 58 (the dashed line) through the second housing element 52 or the second section of the housing 50 is inclined relative to the vertical orientation by an angle 59. Both housing elements are configured to be virtually rotationally symmetrical relative to their center axes 56 and 57. In particular the round cross-section of the second section 52 in front of the sensor with the first and the second electrode serves to cause the foam to be mixed into the flowing fluid in the relevant measuring area such that any present or forming foam will be flushed off and cannot accumulate.

In particular the inclination of the first housing element 51 causes the fluid to flow through the housing 50 in a helical pattern. The fluid flowing in is guided radially and due to gravity an additional, axial factor is introduced.

In this embodiment the housing 50 includes an overflow or a partition wall 19 which is provided herein between the first housing element 51 and the second housing element 52 and extends from the roof rearwardly and downwardly at an incline. The partition 19 closes off the device in the upper region such that fluid can only pass beneath from the first housing element 51 to the second housing element 52. The partition 19 serves to additionally decelerate the flow velocity and to better mix the foam in since the foam floating on the liquid can only pass the clear cross-section beneath the overflow when it is mixed in, since the clear cross-section tends to be beneath the liquid level. Other embodiments may be provided without a partition 19.

Generally, the helical fluid movement continues through the entire housing 50 so as to provide a helical fluid movement also in the second, substantially cylindrically configured housing element 52, at least with strong fluid flows.

It is a substantial advantage of this structure that the foam portion of the fluid is entrained and mixed in. In conventional housing structures and flow conditions, foam tends to rise and to accumulate above the flowing liquid portion of the fluid as a stationary foam portion. The present configuration largely avoids this. The foam portion is reliably discharged at least in the milk flows occurring during the main milking phase. At the beginning and ending of milking the foam portion is as a rule also reliably discharged. Since the principle of the measuring method employed includes the foam portion, the measuring accuracy achieved is excellent as a whole.

The fluid 1 is dammed in front of the drain 5 in the second housing element 52 by way of a flow resistance 6 provided in the shape of a diaphragm in this case, emptying into the drain 5.

Figure 5:
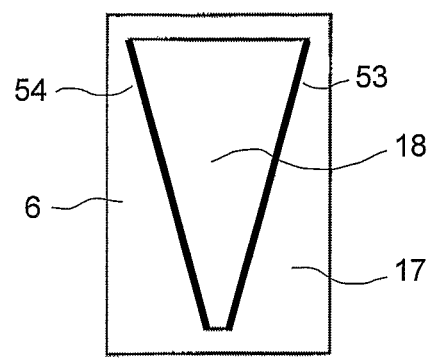
FIG. 5 a flow resistance for large mass flows configured as a diaphragm.

The measuring device 7 is formed by the two electrodes 8, 9 and the voltmeter means 13 and the voltage source 12 or the voltage generator means. The electrodes of the measuring device 7 may be placed in the vicinity of the flow resistance 6. The diaphragm may in particular be formed by the electrodes as illustrated in FIG. 5 such that a first sidewardly boundary 53 of the diaphragm may serve as the first electrode 9 and the second sidewardly boundary 54, as the second electrode 8.

Figure 4A:
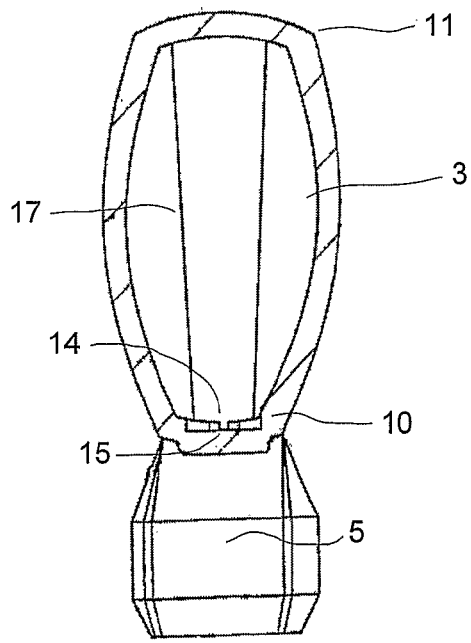
FIG. 4A a device according to the invention as in FIG. 1 in a cross section in the region of the measuring device.
Figure 4B:
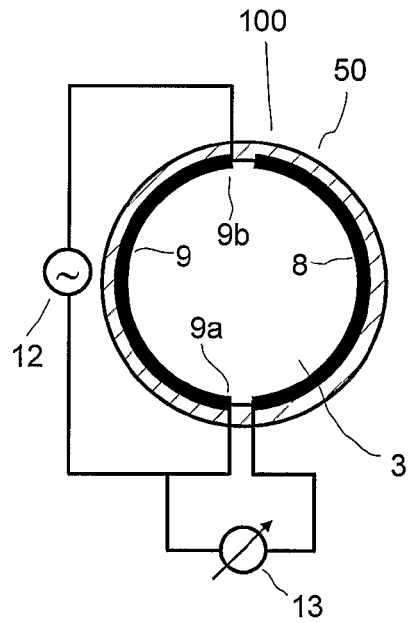
FIG. 4B a second embodiment of a device according to the invention in a cross section in the region of the measuring device.

Although the first electrode 9 in FIG. 3 is configured as a round bar of a conductive material (e.g. high-grade steel), it may be incorporated into a wall of the channel 3 as illustrated in FIG. 4B.

The voltage generator means 12 serves to predetermine an alternating voltage so as to avoid electrolytic deposits on the electrodes 8, 9 which would cause an impediment of voltage measurement. The frequencies employed are conventional.

The density of the fluid 1 flowing through is determined by way of a first electrode 9 and a second electrode 8 in that electric lines 22 and a voltage generator means 12 apply voltage to the first electrode 9 between remote spots 9a and 9b of the first electrode 9. The voltage can be applied in particular, as illustrated in the present embodiment, between the first end 10 and a second end 11 of the first electrode 9. The first end 10 and the first spot 9a at the first electrode 9 are provided herein in the bottom region of the housing while the second spot 9b and the second end 11 are positioned in the upper region of the housing.

The resistance of the electrode 9 is selected such that it is considerably smaller than that of the fluid to be measured at maximum fill height. In this way the influence of the fluid resistance on the total resistance can be neglected in a first approximation. However, said influence may be included in the calculation.

The applied potential depends on the individual case. In this embodiment the peak value of the alternating voltage is 60 mV while the impedance of the electrode 9 is approximately 100 milliohms.

In the first electrode the potential linearly increases with the height. The applied potential is introduced into the fluid at each location wetted with fluid. By way of the low absolute height of the potentials adverse effects on the animals to be milked are avoided.

The second electrode 8 extends from a first spot 8a or from a first end in the bottom region of the housing up to a second spot 8b or a second end in the upper region of the housing, acquiring a potential related to the fill height of the fluid 1 and the composition of the fluid. The voltmeter means 13 serves to connect the spot 8a of the second electrode 8 with the spot 9a of the first electrode 9 or the lower end 10 of the first electrode 9. Where only a pure liquid phase is present, a corresponding potential is applied to the second electrode 8 corresponding to the level of the flowing fluid and measured with the voltmeter means 13. The foam portion 2 is included since the specific impedance of the foam is correspondingly higher than that of the liquid phase. The impedance portions of the liquid phase and the foam phase combined form a total impedance which is representative of the density.

FIG. 3 shows a cross-section through an inventive device 100 comprising a first electrode 9 configured as a round bar and a second electrode 8 likewise configured as a round bar. The two electrodes 8 and 9 extend into a recess 14 in which fluid will accumulate even with lowest mass flows so as to establish an electrical connection between the first electrode 9 and the second electrode 8 via the liquid phase. An electrical contact via the liquid phase is important at the beginning of milking and in particular near the end of milking when the milk flow is low or insignificant. Where no liquid phase is present and only foam remains, measuring errors might otherwise occur.

A hollow filled with liquid phase ensures that correct measuring results will be obtained even with mass flows comprising a virtually pure foam phase.

Basic, simple embodiments also allow a small resistance to be connected in parallel instead of a hollow to simulate a "hollow". Satisfactory results may be obtained also in this way although with small flows of virtually purely foam the fluid conductance may influence the measurement results.

This measure allows measuring the potential even with the smallest mass flows. The recess 14 comprises a drain 15 through which fluid 1 can continuously drain off such that the fluid 1 in the recess 14 is continuously exchanged.

Any temporary variations of the conductivity of the fluid 1 are thus also sensed in the recess 14 so as not to cause inaccuracies in measuring. A minimum level of liquid forms by way of the recess 14 such that in potentiometric measuring not the fill height of the foam but the average density of the fluid 1 is determined.

Figure 6:
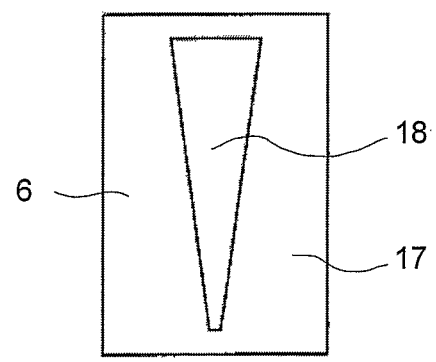
FIG. 6 a flow resistance for small mass flows configured as a diaphragm.

FIGS. 5 and 6 show different embodiments of the flow resistance 6 as a diaphragm 17 having different conically tapering or trapezoidal opening cross-sections 18. The opening cross-sections 18 may be adjusted to specific measurements which offers the advantage that even small mass flows permit reliably measuring changes of the liquid level.

A specific embodiment of the device provides for a diaphragm 17 as illustrated e.g. in FIG. 5. The two electrodes 8, 9 may form the boundaries of the diaphragms 17 in that one edge 53 forms the first electrode 9 and the second edge 54, the second electrode 8. This configuration was originally considered disadvantageous since it had been expected that the potential introduced into the first electrode 9 would be irregular and the potential sensed with the second electrode 8 would also be irregular since the distance of the electrodes greatly varies above the height. Surprisingly it has been found though that this configuration results in high quality measuring results although the two electrodes are not positioned parallel relative to one another. The V-shape or the trapezoidal shape of the electrodes does not impair measuring. To the contrary, this configuration permits to obtain especially reliable measurements. The reason is among other things that the entire flowing fluid flows through the diaphragm and the density is determined between the two electrodes.

Figure 7:
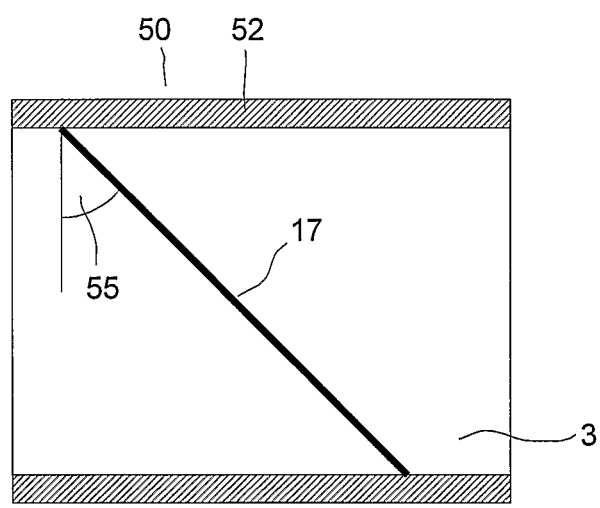
FIG. 7 a longitudinal section of another embodiment of a device according to the invention.

FIG. 7 is a side view of a modified embodiment of the flow resistance. In this configuration the flow resistance is positioned at an incline to the vertical. While the angle to the vertical is approximately 45° herein, it may be between 0° and 60° or larger.

In this embodiment the edges of the diaphragm 17 may again be formed by one or both of the electrodes. Again the diaphragm 17 is trapezoidal in cross-section 18 as illustrated in the FIGS. 5 and 6. The diaphragm is inclined in the direction of flow. In this way, foreign particles in the flowing fluid which might otherwise settle in a bottom region of the diaphragm are flushed upwardly until the cross-section of the diaphragm is sufficient to entrain and flush off the foreign particles. Occlusion of the diaphragm will thus not occur as a rule.

Figure 8:
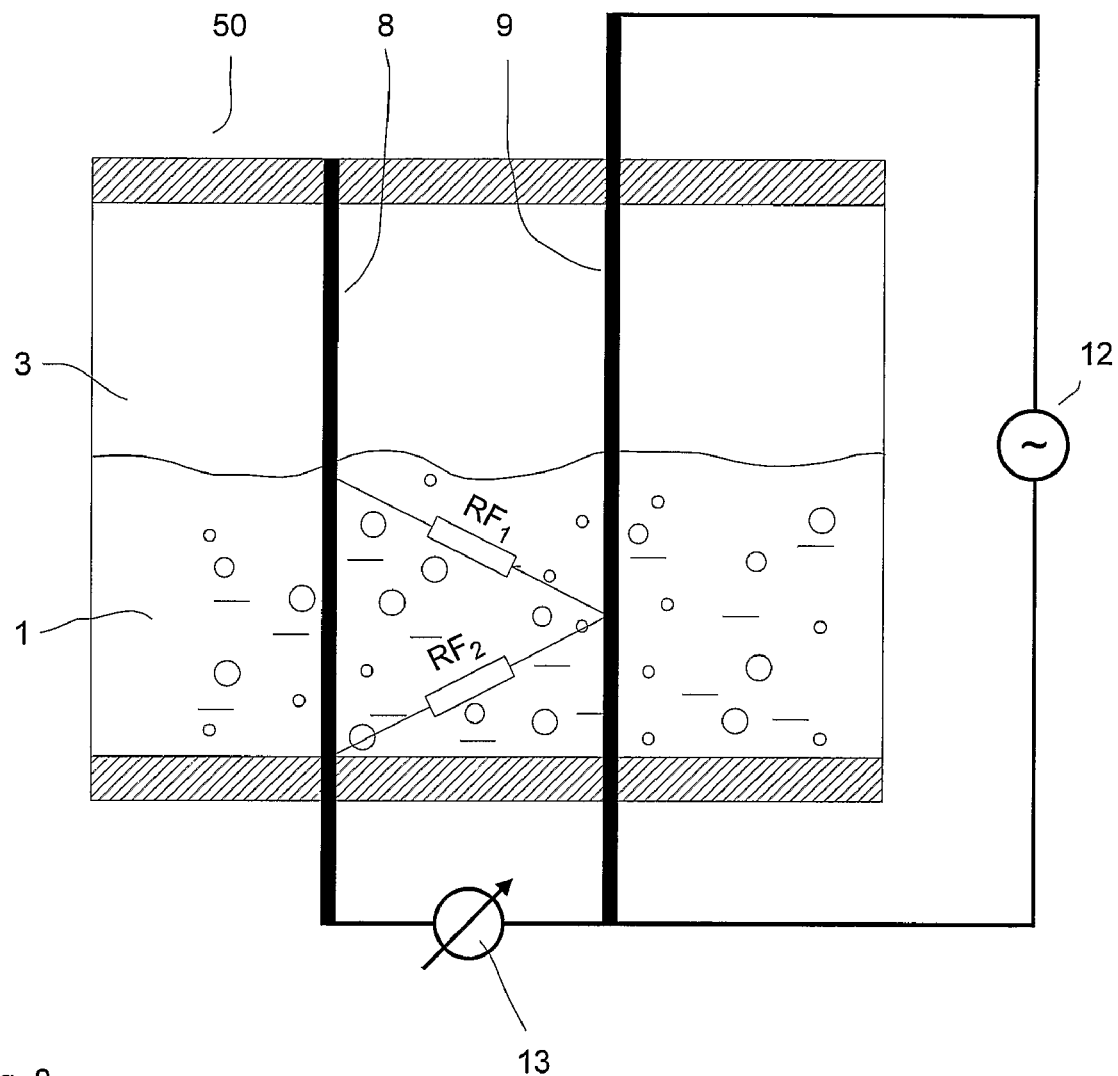
FIG. 8 an electrical equivalent circuit for a device according to the invention.

In FIG. 8 an equivalent diagram of the measuring principle is drawn in. The first electrode 9 consists of a low-resistance high-grade steel bar immersed into the conductive liquid-gas mixture. The voltage generator means 12 drives a high frequency current through the first electrode 9 via the supply lines 22. A voltage is measured by the voltmeter means 13 between the first electrode 9 and the second electrode 8.

The center equivalent resistances RF1 and RF2 of the liquid-gas mixture lie parallel to the immersed portion of the first electrode 9. The collected voltage is thus proportional to the density curve at the first electrode 9. Controlled current feed serves to minimize the direct effect of the center equivalent resistances RF1 and RF2 to the measuring result.

The invention claimed is:

1. A device for measuring the mass flow of a foaming liquid, having at least one measuring device comprising:
a first electrode, a second electrode, at least one device, and an analyzer, wherein the electrical device is connected to two spaced-apart spots of the first electrode, and the second electrode is electrically connected with the first electrode via the analyzer.

2. The device according to claim 1, wherein the electrical device is a voltage source.

3. The device according to claim 1, wherein the electrical device is a constant power source.

4. The device according to claim 1, wherein the analyzer comprises a voltage measuring device.

5. The device according to claim 1, and further comprising:
a foaming liquid flow channel having an internal height, and wherein at least one of the electrodes extends over the internal height of the foaming liquid flow channel.

6. The device according to claim 1, and further comprising:
at least one inlet and at least one outlet.

7. The device according to claim 1, wherein the first electrode and the second electrode extend into a foaming liquid collecting hollow in a bottom area of the device.

8. The device according to claim 7, wherein the foaming liquid collecting hollow comprises a drain.

9. The device according to claim 1, wherein at least one of the electrodes is formed by an electrically conductive rod which is in particular configured in a cross-sectional shape selected from the group consisting of:
round; oval, triangular, quadrangular, and multi-angular, flat, or rounded.

10. The device according to claim 1, wherein the first electrode and the second electrode are disposed relative to one another to define a flow path restriction that restricts foaming liquid flow through the device.

11. The device according to claim 1, wherein a position of at least one of the electrodes is variable relative to the other electrode.

12. The device according to claim 1, wherein at least one of the electrodes is positioned in a housing portion of the device.

13. The device according to claim 1, wherein the first electrode and the second electrode are positioned relative to one another to define a slot that restricts foaming liquid flow through the device.

14. The device according to claim 1, wherein at least one electrode is positioned in an upstream direction from the other electrode.

15. The device according to claim 6, and further comprising:
a bypass between the inlet and the outlet to stabilize a pressure above a measuring section in the device.

16. The device according to claim 1, and further comprising:
a third electrode.

17. The device according to claim 16, and further comprising a measuring section, and wherein the third electrode extends into the measuring section from above.

18. The device according to claim 1, and further comprising:
at least one inclination sensor for determining at least one inclination angle of the device.

19. The device according to claim 1, wherein the analyzer includes at least one correction parameter to take into account at least one inclination angle of the device.

20. The device according to claim 19, and further comprising:
a measuring vessel for collecting foaming liquid to be measured.

21. The device according to claim 20, wherein the measuring vessel has the first electrode and the second electrode are positioned at least partially in the measuring vessel.

22. The device according to claim 19, wherein the quantity of foaming liquid in the measuring vessel is determined by the analyzer.

23. A device for measuring the mass flow of a foaming liquid, having at least one measuring device comprising:
a first electrode, a second electrode, at least one device, and an analyzer, wherein the electrical device is connected to two spaced-apart spots of the first electrode, and the second electrode is electrically connected with the first electrode via the analyzer, wherein the analyzer includes at least one correction parameter to take into account at least one inclination angle of the device;
wherein the quantity of foaming liquid in the measuring vessel is determined by the analyzer; and
wherein the analyzer is programmable to establish a difference in foaming liquid quantity over a time interval to determine a mass flow of foaming liquid.

24. A configuration comprising:
a first device and a second device, and each device comprises:
a first electrode, a second electrode, an electrical device, and an analyzer, wherein the electrical device is connected to two spaced-apart spots of the first electrode, and the second electrode is electrically connected with the first electrode via the analyzer.

25. A configuration for measuring at least two mass flows in a foaming liquid, comprising at least one electrical device for generating an electrical magnitude and at least one analyzer, and at least two devices, each device comprising:
a housing with a measuring section and at least two electrodes a first electrode and a second electrode wherein the electrical device is connected alternatingly and substantially parallel to the first electrode of the first device and substantially parallel to the first electrode of the second device.

26. A configuration for measuring at least two mass flows in a foaming liquid, the configuration comprising:
at least one electrical device for generating an electrical magnitude;
at least one analyzer; and
at least two devices, each device comprising:
a housing defining a measuring section a first electrode and a second electrode, wherein the analyzer is connected alternatingly between the first and the second electrode of one device and between the first and the second electrode of another device.

27. The configuration according to claim 25, wherein only one electrical device and only one analyzer is provided.

28. The configuration according to claim 24, wherein the first device and the second device are disposed in a parallel relationship.

29. A configuration comprising:
a first device and a second device, and each device comprises:
a first electrode, a second electrode, an electrical device, and an analyzer, wherein the electrical device is connected to two spaced-apart spots of the first electrode, and the second electrode is electrically connected with the first electrode via the analyzer, wherein the first device and the second device are disposed in a parallel relationship; and
wherein the configuration is adapted to measure milk from an animal being milked, and at least one device comprises:
a plurality of measuring sections, wherein the number of measuring sections corresponds to a number of teats of the animal being milked.

30. The configuration according to claim 24, wherein the first device comprises a smaller flow cross-section than a flow section in the second device.

31. A method for measuring the flow of a foaming liquid comprising the steps of:
applying an electrical magnitude to two spaced apart spots on a first electrode that is positioned in the foaming liquid; and
generating an electrical signal between the first electrode and a second electrode to be analyzed by an analyzer positioned between the first electrode and the second electrode.

* * * * *